Feb. 23, 1943.    G. O. HOGLUND    2,312,039
DUPLEX METAL ARTICLE
Original Filed April 14, 1939

INVENTOR
GUSTAV O. HOGLUND
BY George L. Wallace
ATTORNEY

Patented Feb. 23, 1943

2,312,039

UNITED STATES PATENT OFFICE 2,312,039

DUPLEX METAL ARTICLE

Gustav O. Hoglund, New Kensington, Pa., assignor to Aluminum Company of America, Pittsburgh, Pa., a corporation of Pennsylvania Original application April 14, 1939, Serial No. 267,915, now Patent No. 2,258,681, dated October 14, 1941. Divided and this application September 12, 1941, Serial No. 410,601

3 Claims. (Cl. 29—181)

This invention relates to duplex metal articles, particularly of the type comprising a base of aluminous (aluminum or aluminum base alloy) metal provided on one or more of its surfaces with an aluminous metal coating which is capable of joining with other metal articles by virtue of the application of heat in conjunction with a flux.

The object of the present invention is to provide a duplex metal article, a part of which forms a joining metal.

Heretofore, in producing certain types of unitary structures which have been assembled from a number of component parts, it has been the practice to assemble the individual parts with a joining metal, and after having applied a suitable flux thereto, to heat the assembly by a hand torch, a heated iron, or other heat applying means. In following this practice, considerable time is consumed by the operator in applying the necessary heat to make the joint, and uniformity of the completed joints is dependent to a great extent upon the skill in manipulation by the individual. If the heat necessary to effect the joining is supplied by a furnace, the joining metal has generally taken the form of rod, wire, sheet, or foil. If this method of joining is practiced, variation in temperature of heat supply is not as likely as if effected by torch or iron; but there remains the probability of non-uniform joints because the joining metal is generally placed at the desired points of jointure by hand, and the likelihood of it being displaced as a result of movement of the assembly and to the application of flux is appreciable.

Figure 1:
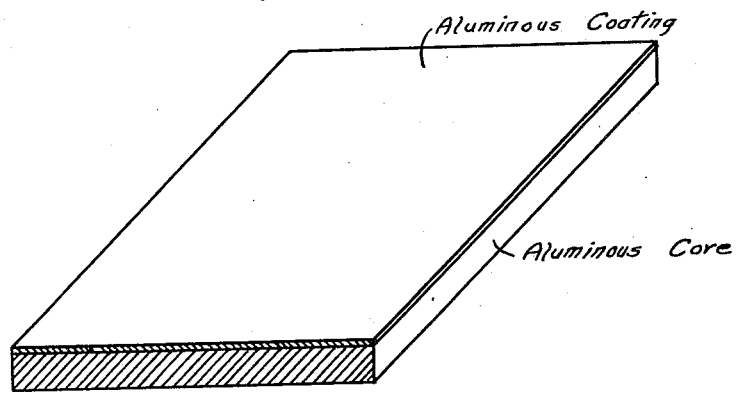
Figure 2:
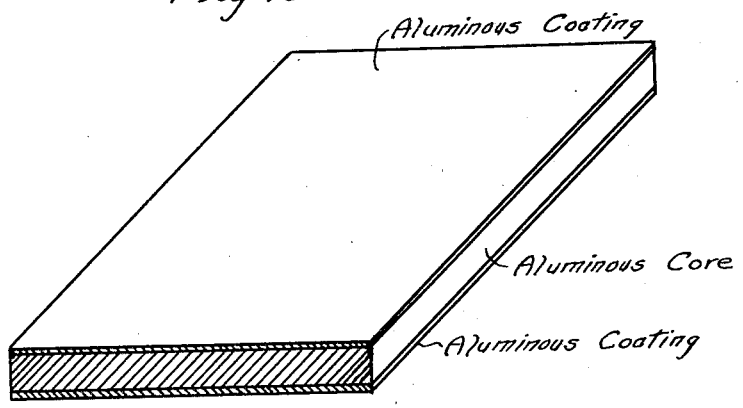

The accompanying drawing depicts a core or base of aluminum coated with a film or coating of an aluminum base alloy on one side in Fig. 1 and on both sides in Fig. 2.

According to my invention, the joining metal takes the form of a film or coating integral with the parts to be joined. This film or coating is an aluminum base alloy containing about 2 per cent to 12 per cent silicon, and may by one method be integrally joined to a base or core metal by rolling when heated to a sufficiently high temperature. This results in the coating being joined to the core by an alloy bond. I have found that coatings containing silicon in this range possess certain unusual characteristics which make it possible to make a sound joint under proper conditions. These coatings, although exeremely thin (usually less than .001 inch, for example), are capable of flowing upon application of a suitable flux and heat. When suitably heated, even though the coating be not completely fluid but in a plastic condition, a part of the alloy, largely of eutectic composition, spreads from adjacent areas towards any capillary space to make a sound fillet and joint without disturbance of the coating at points distant from the joint. This can be accomplished because silicon has a low enough rate of diffusibility so that when employed according to my invention, in a coating of aluminum-silicon alloy on aluminum or aluminum alloy base, it does not, upon suitable application of heat (i. e. sufficient heat to cause eutectic melting), penetrate into the core to any appreciable extent. To this alloy other elements may be added for purposes of changing the appearance, mechanical properties, electrolytic potential (i. e. corrosion resistance), or other properties as may be desired. Such additions, however, should be made in such manner and amount as to avoid material depreciation of the above mentioned functions of the aluminum-silicon alloy.

It will be appreciated that in making the joining metal integral with the parts to be joined, the joining or filler material is always properly positioned with respect to the points of jointure, thereby obviating the likelihood of dislodging the filler material and thereby effecting improper joining. It will be realized that because of my invention it is unnecessary to apply the joining material as, for example, by hand, thereby eliminating a step which has been necessary in the prior practice. My invention is particularly advantageous in that it is possible to form joints in complicated structures in which it has heretofore been impossible, or at best impractical especially from a production standpoint, to position the joining metal. In addition, better control of the amount of filler material going into the completed joint is possible because the coating can be made to any uniform desired thickness.

In joining two pieces of steel by the use of a copper joining material, considerable care must be exercised in the application of heat, both as to degree and time, even though there is a difference of about 800° in their melting points. A very difficult problem is presented, however, in joining aluminous parts with an aluminous coating material where the difference in melting points is less than 100°. I have discovered, however, that this can be regularly accomplished with a care consistent with commercial production operations if the particular filler material I have specified is employed. For example, in the case of one alloy of aluminum which had been coated with an aluminum-silicon alloy of from about 5 per cent to 10 per cent silicon, the preferable furnace time and temperature range to effect a joining are about 6 to 10 minutes at from about 1075° F. to 1180° F. The melting point of the aluminum base alloy core is about 1200° F.

I have been successful in using an aluminum alloy joining material as a coating on aluminum or an aluminum base alloy, even though their melting points are not far apart because of my discovery that the aluminum-silicon alloy when partially melted and in plastic condition contains a fluid portion which will spread. Furthermore, this eutectic portion which flows or spreads into the joint is strong and tough.

In using the duplex metal article of my invention, sufficient heat is applied to cause the aluminum-silicon alloy coating to melt at least in part and enter between the individual parts to be joined. This may be carried out in the non-oxidizing environment by utilizing any suitable gas or mixture of gases.

It will be appreciated that I have invented a novel material for joining a plurality of aluminum or aluminum alloy parts by virtue of coating the aluminum or aluminum alloy parts with a joining or filler metal of aluminum-silicon alloy, and that in so doing I have eliminated the time consuming and expensive step of applying the filler metal by hand. It will also be appreciated that uniform joints are obtainable by the use of my invention because the metal entering into the weld is carried as a coating of uniform thickness on the parts to be joined.

This application is a division of my copending application, Serial No. 267,915, filed April 14, 1939 and issued as Patent No. 2,258,681 on Oct. 14, 1941.

I claim:

1. A composite aluminous body characterized by its adaptability to join with other aluminous bodies in the presence of a flux and heat, said body comprising an aluminous core and an aluminous coating, said coating containing from about 2 per cent to about 12 per cent silicon and being integrally joined to said core by an alloy bond of said core and coating.

2. A composite aluminous body characterized by the adaptability of the coating portion of said composite body to join with other aluminous bodies in the presence of a flux and heat, said body comprising an aluminous core and an aluminous coating, said coating containing from about 2 per cent to about 12 per cent silicon and being integrally joined to said core by an alloy bond of said core and coating.

3. A composite aluminous body comprising an aluminous core and an aluminous coating and characterized by the adaptability of said coating to join with other aluminous bodies in the presence of a flux and heat without fusion of said core, said coating containing from about 2 per cent to about 12 percent silicon and being integrally joined to said core by an alloy bond of said core and coating.

GUSTAV O. HOGLUND.